US00RE43794E

(19) United States
(12) Reissued Patent
Kim et al.

(10) Patent Number: US RE43,794 E
(45) Date of Reissued Patent: Nov. 6, 2012

(54) ANODE ACTIVE MATERIAL, METHOD OF MANUFACTURING THE SAME, AND LITHIUM BATTERY USING THE SAME

(75) Inventors: Han-su Kim, Yongin-si (KR); Dong-min Im, Yongin-si (KR)

(73) Assignee: Samsung SDI Co., Ltd., Yongin-si (KR)

(21) Appl. No.: 13/218,102

(22) Filed: Aug. 25, 2011

Related U.S. Patent Documents

Reissue of:
(64) Patent No.: 7,736,804
Issued: Jun. 15, 2010
Appl. No.: 11/527,750
Filed: Sep. 25, 2006

(30) Foreign Application Priority Data

Sep. 23, 2005 (KR) ..... 1020050088720

(51) Int. Cl.
*H01M 4/58* (2010.01)
*H01M 4/04* (2006.01)

(52) U.S. Cl. ..... 429/218.1; 429/231.8; 429/231.1; 252/182.1

(58) Field of Classification Search ..... None
See application file for complete search history.

(56) References Cited

U.S. PATENT DOCUMENTS

| | | | |
|---|---|---|---|
| 6,541,156 | B1 | 4/2003 | Fuse et al. |
| 6,797,434 | B1 | 9/2004 | Matsubara et al. |
| 2002/0009646 | A1 | 1/2002 | Matsubara et al. |
| 2003/0207177 | A1 | 11/2003 | Matsubara et al. |
| 2004/0214087 | A1 | 10/2004 | Sheem et al. |
| 2004/0234859 | A1 | 11/2004 | Lee et al. |
| 2006/0216606 | A1 | 9/2006 | Kim et al. |

FOREIGN PATENT DOCUMENTS

| | | | |
|---|---|---|---|
| CN | 1402366 | A | 3/2003 |
| CN | 1650449 | A | 8/2005 |
| CN | 1667855 | A | 9/2005 |
| JP | 11-073969 | | 3/1999 |
| JP | 11-260369 | | 9/1999 |
| JP | 11-260369 | A * | 9/1999 |

(Continued)

OTHER PUBLICATIONS

Chinese Office action, with English Translation, dated Apr. 11, 2008, for corresponding Chinese Patent Application No. 2006101595077, indicating relevance of the U.S. and Japanese patent documents.

(Continued)

*Primary Examiner* — Barbara Gilliam
*Assistant Examiner* — Angela Martin
(74) *Attorney, Agent, or Firm* — Christie, Parker & Hale, LLP

(57) ABSTRACT

Anode active materials, methods of producing the same and lithium batteries using the same are provided. More particularly, an anode active material having high capacity and excellent capacity retention, a method of producing the same and a lithium battery having a long lifespan using the same are provided. The anode active material comprises complex material particles comprising silicon and graphite, a carbon layer covering the surface of the complex material particles, and a silicon-metal alloy formed between the complex material particles and the amorphous carbon layer.

34 Claims, 6 Drawing Sheets

FOREIGN PATENT DOCUMENTS

| | | | |
|---|---|---|---|
| JP | 2002-255529 | | 9/2002 |
| JP | 2004-55505 | | 2/2004 |
| JP | 2004-55505 A | * | 2/2004 |
| JP | 2005-71655 | | 3/2005 |

OTHER PUBLICATIONS

SIPO Registration Determination Certificate dated Nov. 25, 2009, with English cover page, for corresponding Chinese application 200610159507.7 noting listed references in this IDS, as well as U.S. Patent 6,541,156 and JP 2004-55505.

Patent Abstracts of Japan, Publication No. 11-073969; Date of Publication: Mar. 16, 1999; in the name of Yoshito Konno et al.

Patent Abstracts of Japan, Publication No. 11-260369; Date of Publication: Sep. 24, 1999; in the name of Hajime Yasuda et al.

Patent Abstracts of Japan, Publication No. 2002-255529; Date of Publication: Sep. 11, 2002; in the name of Keiko Matsubara et al.

Patent Abstracts of Japan, Publication No. 2004-055505; Date of Publication: Feb. 19, 2004; in the name of Masayuki Yoshio et al.

Patent Abstracts of Japan, Publication No. 2005-071655; Date of Publication: Mar. 17, 2005; in the name of Shuhin Cho et al.

Patent Abstract of Japan, Publication No. 2005-071655, Published on Mar. 17, 2005, in the name of Cho, et al.

Chinese Office Action, with English Translation, dated Apr. 11, 2008, for corresponding Chinese Patent Application No. 2006101595077, indicating relevance of the U.S. and Japanese patent documents cited in an IDS on Jul. 16, 2008.

SIPO Registration Determination Certificate dated Nov. 25, 2009, with English cover page, for corresponding Chinese application 200610159507.7, noting listed references in this IDS, as well as U.S. Appl. No. 6,541,156 and JP 2004-55505, both previously filed in an IDS dated Jul. 16, 2008.

* cited by examiner

ANODE ACTIVE MATERIAL, METHOD OF MANUFACTURING THE SAME, AND LITHIUM BATTERY USING THE SAME

Matter enclosed in heavy brackets [ ] appears in the original patent but forms no part of this reissue specification; matter printed in italics indicates the additions made by reissue.

CROSS-REFERENCE TO RELATED PATENT APPLICATION

This application claims priority to and the benefit of Korean Patent Application No. 10-2005-0088720, filed on Sep. 23, 2005, in the Korean Intellectual Property Office, the entire content of which is incorporated herein by reference.

BACKGROUND OF THE INVENTION

1. Field of the Invention

The present invention relates to an anode active material, a method of producing the same and a lithium battery using the same. More particularly, the invention is directed to an anode active material having high capacity and excellent capacity retention. The invention is also directed to a method of producing the anode active material and to a lithium battery using the anode active material and having a long lifespan.

2. Description of the Related Art

Lithium metal has been used as the anode active material. However, when lithium metal is used, dendrites can form causing battery short-circuits, resulting in a risk of explosion. Accordingly, carbon-based materials are widely used for the anode active material instead of lithium metal.

Examples of carbon-based active materials used for the anode active material in lithium batteries include crystalline-based carbon (such as natural graphite and artificial graphite) and amorphous-based carbon (such as soft carbon and hard carbon). Although amorphous-based carbon has high capacity, charge/discharge reactions are highly irreversible. Natural graphite is the main crystalline-based carbon used, and its theoretical capacity is high (at 372 mAh/g). Therefore, crystalline-based carbon is widely used as an anode active material. However, the cycle life of such batteries may be very short.

The theoretical capacity of about 380 mAh/g of such a graphite or carbon-based active material (which is currently considered a high capacity) may not be sufficient for future lithium batteries that may require higher capacities.

In order to overcome this problem, research has been actively conducted into metal-based anode active materials and intermetallic compound-based anode active materials. For example, research has been conducted into lithium batteries using metals such as aluminum, germanium, silicon, tin, zinc, lead, etc. or semimetals as anode active materials. Such materials have been known to have large capacities, high energy densities, and good intercalation and deintercalation capabilities compared to anode active materials using carbon-based materials. Thus, lithium batteries having large capacities and high energy densities can be prepared using these materials. For example, pure silicon is known to have a high theoretical capacity of 4017 mAh/g.

However, such materials have shorter cycle lifespans than carbon-based materials, and thus cannot be put to practical use. When an inorganic material (such as silicon or tin) is used in the anode active material as a lithium intercalating and deintercalating material, the volume of the inorganic material changes during charge/discharge cycles, resulting in the degradation of conductivity between the active materials or in the detachment of the anode active material from the anode current collector, as shown in FIG. 1. That is, the volume of the inorganic material (such as silicon or tin) increases by about 300 to 400% during charging through the intercalation of lithium, and the volume decreases during discharging through the deintercalation of lithium. Therefore, when charge/discharge cycles are repeated, spaces may be generated between the inorganic particles and the active materials, and electrical insulation may occur, thereby rapidly degrading the cycle life of the battery.

Therefore, a need exists for an anode active material with high capacity and excellent capacity retention properties, and for a lithium battery with a long cycle life employing the anode active material.

SUMMARY OF THE INVENTION

In one embodiment of the present invention, an anode active material has high capacity and excellent capacity retention.

In another embodiment of the present invention, a method of preparing the anode active material is provided.

In yet another embodiment of the present invention, a lithium battery employs the anode active material.

According to one embodiment of the present invention, an anode active material comprises complex material particles containing silicon and graphite, a carbon layer covering the surface of the complex material particles, and a silicon-metal alloy formed between the complex material particles and the carbon layer.

In the complex material particles, the weight ratio of silicon to graphite may be about 2.0 or less.

The carbon layer may be an amorphous carbon layer. The carbon layer may be present in an amount ranging from about 1 to about 20 wt % based on the total weight of the anode active material. The carbon layer may cover only a portion or the entire surface of the complex material particles.

In the silicon-metal alloy, the molar ratio of metal to silicon may be about 0.01 or greater. Nonlimiting examples of suitable metals for use in the silicon-metal alloy include nickel, cobalt, copper, zinc, aluminum magnesium and mixtures thereof. In one embodiment, the silicon-metal alloy may be a silicon-nickel alloy.

According to another embodiment of the present invention, a method of preparing an anode active material comprises forming complex material particles containing silicon and graphite by mixing silicon particles and graphite particles and milling the mixture. The method further comprises forming a silicon-metal alloy and a carbon layer by adding a long-chain metal carboxylate salt to the complex material particles and heat-treating the mixture in vacuum or under an inert gas atmosphere.

The long-chain metal carboxylate salt may include 20 or more carbon atoms and the metal may be nickel, cobalt, copper, zinc, aluminum or magnesium. Nonlimiting examples of suitable long-chain metal carboxylate salt include nickel stearate, nickel oleate, nickel palmitate, nickel linoleate, nickel laurate, nickel myristate, copper stearate, copper oleate, copper palmitate, copper linoleate, copper laurate, copper myristate and mixtures thereof.

In one embodiment, the milling may include high energy ball milling.

In one embodiment, the heat-treatment may be performed at a temperature of from about 500 to about 1200° C. for about 0.5 to about 5 hours.

In one embodiment, the average diameter of the silicon particles may be from about 0.05 to about 1 μm.

In one embodiment, the average diameter of the graphite particles may be from about 1 to about 20 μm.

According to another embodiment of the present invention, a lithium battery employs the anode active material.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

The present invention will now be described more fully with reference to the accompanying drawings, which illustrate certain exemplary embodiments of the invention. The illustrated embodiments are provided for illustrative purposes only and are not to be construed as limiting the invention. Rather, the invention may include many different variations.

Figure 2:
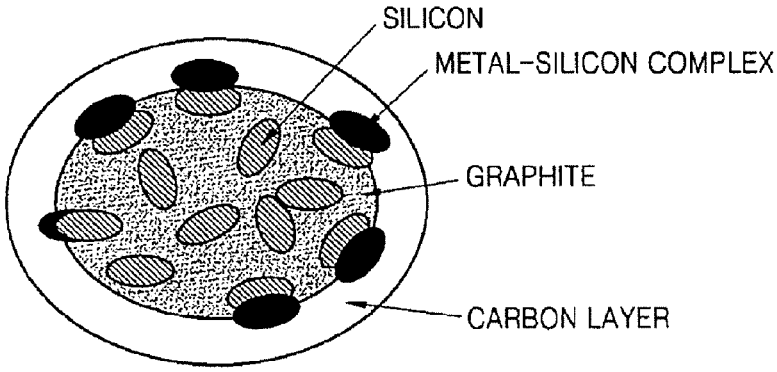
FIG. 2 is a sectional view of an anode active material according to one embodiment of the present invention.

As illustrated in FIG. 2, an anode active material according to one embodiment of the present invention includes complex material particles containing silicon and graphite, a carbon layer covering the surface of the complex material particles, and a silicon-metal alloy formed between the complex material particles and the carbon layer.

In another embodiment, the anode active material can comprise a first material forming a core, a second material forming a shell, and a third material between the core and the shell. Graphite and silicon can be used for the first material. Graphite (which is widely used as a conventional anode active material) is a crystalline-based carbon and retains its capacity without substantial volume changes during charging/discharging. In order to improve the capacity of such carbon-based materials, silicon particles (which are inorganic) are mixed with the carbon-based materials and the mixture is used as the anode active material. Silicon particles have a theoretical capacity of about 4017 mAh/g, and thus improve the capacity. However, the volume of the silicon particles sharply changes during charging/discharging. Therefore, when silicon and graphite are used as the first material, the cycle characteristics and the capacity of batteries can be enhanced.

The weight ratio of silicon to graphite included in the first material may be about 2.0 or less. In one embodiment, the weight ratio of silicon to graphite is about 1.5 or less. In another embodiment, the weight ratio of silicon to graphite ranges from about 0.5 to about 1.4. When the weight ratio of silicon to graphite is greater than about 2.0, the battery may have excellent capacity, but the cycle properties may degrade during operation of the battery. When the weight ratio of silicon to graphite is less than about 0.5, the capacity is low, resulting in low energy density during operation of the battery.

Meanwhile, the volumes of the silicon (which is an inorganic material) and the metal (which is an intermediate material) may expand, which volume changes may cause electrical insulation, thereby causing a decrease in electron conductivity or ion conductivity. Therefore, in one embodiment of the present invention, a carbon layer having a strong binding force is formed on the surface of the complex material particles (which constitute the first material) to prevent volume expansion.

Figure 1:
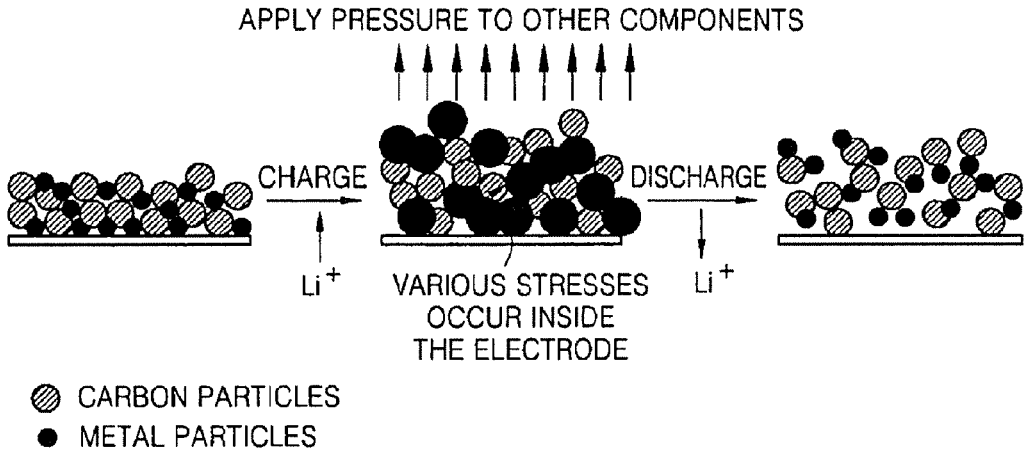
FIG. 1 (PRIOR ART)
FIG. 1 is a schematic illustrating an operating mechanism of a prior art anode active material during charge/discharge.

In general, the volume of active materials repeatedly increases and decreases during charge/discharge cycles, and such volume changes are irreversible, thereby causing electrical insulation. That is, as illustrated in FIG. 1, metals having a higher volume expansion coefficient than carbon-based materials may influence other components or even disintegrate due to expansion inside the electrode during charging. Also, complete restoration does not occur during the discharging process because when the volume of the metal decreases, excess spaces remain around the metal particles. Consequently, electrical insulation may occur between active materials. Such electrical insulation of the active materials causes a decrease in electric capacity, thereby degrading the performance of the battery.

In one embodiment of the present invention, the carbon layer prevents volume expansion due to its strong binding force. The carbon layer may cover a portion of surface or the entire surface of the complex material particles including silicon and graphite (which form the first material). In one embodiment, the carbon layer covers the entire surface of the complex material particles. In another embodiment, the carbon layer uniformly covers the entire surface of the complex material particles. When the surface of the main material is only partly covered, part of the first material is exposed to the electrolyte during battery manufacture. The silicon in the first material or the third material may be quickly pulverized when manufacturing the battery, thereby degrading the cycle properties of the battery.

The carbon layer may be present in an amount ranging from about 1 to about 20 wt % based on the total weight of the anode active material. In one embodiment, the carbon layer is present in an amount ranging from about 3 to about 15 wt % based on the total weight of the anode active material. When the carbon layer is present in an amount greater than about 20 wt %, the discharge capacity of the anode may be low and fusion may occur, resulting in secondary particle formation. When the carbon layer is present in an amount less than about 1 wt %, it is difficult to sufficiently cover the first material.

The amount of the carbon layer required to sufficiently cover the complex material particles including graphite and silicon may vary according to the covering method used, the average particle diameter of the first material particles, etc. That is, as the average diameter of the first material particles decreases, the surface area thereof increases, and thus more of the carbon layer is required to completely or sufficiently cover the surface of the particles. Additionally, the amount of the carbon layer needed may also vary according to the covering method, described further below.

According to one embodiment of the present invention, metal-organic compounds are used as carbon sources. One nonlimiting example of a suitable carbon layer is an amorphous carbon layer formed by sintering organic compounds.

According to one embodiment of the present invention, a metal-silicon alloy as the third material is positioned between the complex material particles including silicon and graphite as the first material and the carbon layer as the second material. The metal in the metal-organic compound (used as the carbon source for the carbon layer) is bonded with the silicon included in the first material to form the metal-silicon alloy. The metal-silicon alloy maintains the electron conductivity or the ion conductivity between the first material and the second material. That is, the metal-silicon alloy decreases contact resistance between the two surfaces (which are formed of different materials).

In the metal-silicon alloy, the molar ratio of metal to silicon may be about 0.01 or greater. In one embodiment, the molar ratio ranges from about 0.1 to about 0.5. When the molar ratio of metal to silicon is less than about 0.01, the rate of generation of the metal-silicon alloy is too low to obtain the desired effects.

The metal of the metal-silicon alloy may be a transition metal, a Group II metal or a Group XIII metal. Nonlimiting examples of suitable metals for the metal-silicon alloy include nickel, cobalt, copper, zinc, aluminum, magnesium and mixtures thereof. The metal is selected for reactivity with silicon and conductivity.

In an anode active material according to one embodiment of the present invention, the carbon-based material (such as graphite) used in the first material maintains high capacity. The inorganic material (such as silicon) provides high capacity and high energy density. The carbon layer with a strong binding force is formed on the surface of the active material to prevent volume expansion caused by the inclusion of inorganic particles, and to maintain cycle properties. The silicon-metal alloy is not involved in the reaction of the carbon layer with the complex material particles during charging/discharging. The silicon-metal alloy has greater electrical conductivity than silicon alone, and is included in the active material to prevent decreases in conductivity caused by contact resistance between the surfaces of two different layers. The silicon-metal alloy also prevents volume changes during charging/discharging, and prevents decreases in electron conductivity, thereby improving electron conductivity and ion conductivity.

According to another embodiment of the present invention, a method of preparing the anode active material is provided. In one embodiment, a method of preparing an anode active material includes forming complex material particles containing silicon and graphite by mixing silicon particles and graphite particles and milling the mixture. The method further comprises forming a silicon-metal alloy and a carbon layer by adding a long-chain metal carboxylate salt or sulfonate salt to the complex material particles and heat-treating the mixture in a vacuum or under an inert gas atmosphere.

According to one embodiment of the method, the anode active material is economically prepared by simple processes such as milling and sintering.

The silicon particles are simply mixed with the graphite particles and the mixture is fully mixed by milling. During this process, the silicon particles having smaller average diameters than the graphite particles are mixed with the graphite particles by inserting the silicon particles into spaces between the graphite particles.

The average diameter of the graphite particles may range from about 1 to about 20 μm. In one embodiment, the average diameter of the graphite particles ranges from about 3 to about 10 μm. When the average diameter of the graphite particles is greater than about 20 μm, the carbon layer is difficult to uniformly form. When the average diameter of the graphite particles is less than about 1 μm, it is difficult to properly mix the silicon particles with the graphite particles.

Any silicon particles having sufficiently small particle diameters may be used. In one embodiment, for example, the particle diameter may range from about 0.05 to about 1 μm. When the diameters of the silicon particles are less than about 0.05 μm, side reactions may occur, such as electrolyte decomposition caused by an enlarged surface area. When the diameters of the silicon particles are greater than about 1 μm, capacity retention properties may degrade due to volume change in the silicon during charging/discharging.

When the graphite particles and silicon particles are mixed and the mixture is milled, high energy ball milling may be performed to sufficiently mix the silicon particles into spaces between the graphite particles. The silicon-graphite complex material particles are formed by this milling process.

Then, a metal-organic compound (e.g. a long-chain metal carboxylate salt) is added to the obtained silicon-graphite complex material and the mixture is heat-treated to form the metal-silicon alloy as the third material and the carbon layer as the second material. A silicon-carbon alloy may be formed in addition to the metal-silicon alloy and the carbon layer. However, such a silicon-carbon alloy minimally affects the anode active material since the amount of the silicon-carbon alloy is too small.

A long-chain metal carboxylate salt may be used as the metal-organic compound. The metal included in the long-chain metal carboxylate salt or sulfonate salt may be a metal source for the metal-silicon alloy, and the long-chain metal carboxylate salt may be a carbon source for the carbon layer.

The long-chain metal carboxylate salt (which is a metal-organic compound) may include 20 or more carbon atoms and may include a transition metal, Group II metal, Group XIII metal, etc. Nonlimiting examples of suitable metals for use in the long-chain metal carboxylate salt include nickel, cobalt, copper, zinc, aluminum and magnesium. The metal-organic compound (in particle form) is added to and uniformly mixed with the complex material and the mixture is heat-treated. If desired, the metal-organic compound can be used in liquid, sol or gel form.

Nonlimiting examples of suitable long-chain metal carboxylate salts include nickel stearate, nickel oleate, nickel palmitate, nickel linoleate, nickel laurate, nickel myristate, copper stearate, copper oleate, copper palmitate, copper linoleate, copper laurate, copper myristate and mixtures thereof.

At least one hydrogen atom of the metal-organic compound may be substituted with a proper substituent. Nonlimiting examples of suitable such substituents include alkyl groups having from 1 to 10 carbon atoms, alkenyl groups having from 1 to 10 carbon atoms, heteroalkyl groups having from 1 to 10 carbon atoms, heteroalkenyl groups having from 1 to 10 carbon atoms, halogen atoms, nitro groups, amine groups, and aryl groups having from 6 to 20 carbon atoms.

The heat-treatment may be performed at a temperature ranging from about 500 to about 1200° C. In one embodiment, the heat-treatment is performed at a temperature ranging from about 700 to about 1100° C. In yet another embodiment, the heat-treatment is performed at a temperature ranging from about 800 to about 1000° C. When the temperature is less than about 500° C., the carbon layer is difficult to uniformly form and impurities may be included in the carbon layer. When the temperature is greater than about 1200° C., the process of preparing the anode active material is less economically effective.

The heat-treatment may be performed for about 0.5 to about 5 hours. In one embodiment, the heat-treatment is performed for about 1 to about 4 hours. When the heat-treatment is performed for less than about 0.5 hours, the effect of the heat-treatment is not sufficient. When the heat-treatment is performed for more than about 5 hours, the heat-treatment is less economically effective. The length of heat-treatment can be adjusted according to the heat-treatment temperature.

The mixture of silicon-graphite complex materials formed by milling and metal-organic compounds are heat-treated to uniformly form the carbon layer on the surface of the complex material particles. The metal-silicon alloy is then formed by bonding metal with silicon.

Figure 6:
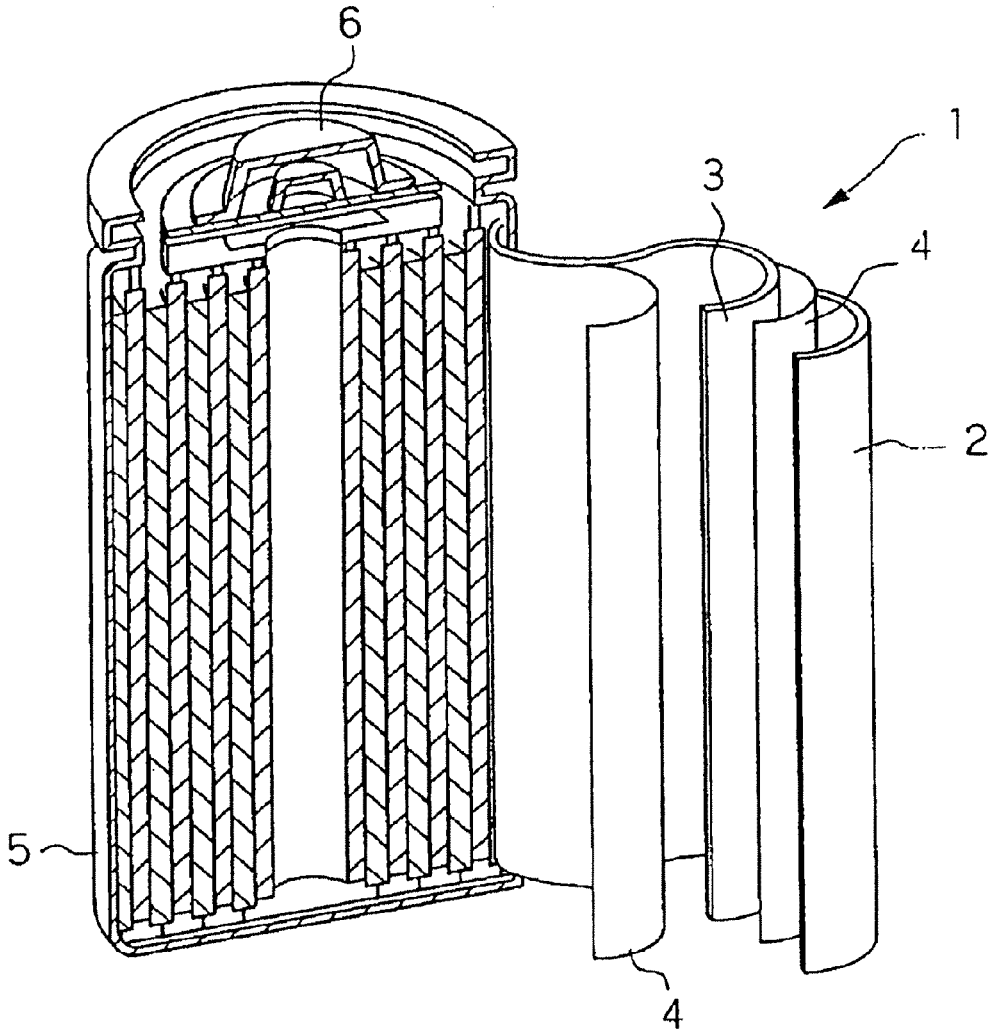
FIG. 6 is a schematic perspective view of a lithium battery according to one embodiment of the present invention.

The obtained anode active material can effectively be used for lithium batteries. A lithium battery according to one embodiment of the present invention is illustrated in FIG. 6. As shown, one exemplary lithium battery 1 includes an electrode assembly comprising a cathode 2, an anode 3, a separator 4 separating the cathode 2 and anode 3. The electrode assembly is contained in a battery case 5 and sealed to complete the lithium battery 1.

To manufacture an exemplary lithium battery, a cathode plate is first prepared by mixing a cathode active material, a conductive material, a binder, and a solvent to prepare a cathode active material composition. The cathode active material composition is directly coated on an aluminum current collector and dried to prepare a cathode plate. Then, the cathode active material composition is cast on a separate support to form a film which is then removed from the support and laminated on an aluminum current collector to prepare a cathode plate.

The cathode active material may be any lithium-containing metal oxide commonly known in the art. Nonlimiting examples of suitable such lithium-containing metal oxides include $LiCoO_2$, $LiNi_{1-x}Mn_xO_{2x}(0<x<1)$, $Li_{1-x-y}Co_xMn_yO_2$ ($0\leqq x\leqq 0.5$, $0\leqq y\leqq 0.5$), etc.

One nonlimiting example of a suitable conductive material is carbon black. Nonlimiting examples of suitable binders include styrene butadiene rubber polymers, vinylidenefluoride/hexafluoropropylene copolymers, polyvinylidenefluoride, polyacrylonitrile, polymethylmethacrylate, polytetrafluoroethylene and mixtures thereof. Nonlimiting examples of suitable solvents include N-methyl pyrrolidone, acetone, water, etc. The amounts of the cathode active material, the conductive material, the binder, and the solvent are the same as those commonly found in lithium batteries.

Similarly, an anode active material, a conductive material, a binder, and a solvent are mixed to prepare an anode active material composition. The anode active material composition is directly coated on a copper current collector to prepare an anode plate. Alternatively, the anode material composition is cast on a separate support to form a film which is then separated from the support and laminated on the copper current collector to prepare an anode plate. The amounts of the anode active material, the conductive material, the binder, and the solvent are the same as those commonly used in lithium batteries.

The anode active material is an anode active material according to any one of the embodiments described above. The conducting agent, the binder and the solvent in the anode active material composition are the same as in the cathode active material composition. If desired, a plasticizer may be added to the cathode active material composition and the anode active material composition to produce pores inside the electrode plates.

Any separator commonly known for use with lithium batters may be used. For example, the separator may have low resistance to ion transfer from the electrolyte and good electrolyte impregnation properties. Nonlimiting examples of suitable separators include non-woven fabrics, woven fabrics, glass fibers, polyester, Teflon, polyethylene, polypropylene, polytetrafluoroethylene (PTFE), and combinations thereof. In a lithium ion battery, for example, a windable separator made of a material such as polyethylene or polypropylene may be used. In a lithium ion polymer battery, however, a separator that can be easily impregnated with an organic electrolyte solution may be used.

One exemplary method for preparing a separator includes mixing a polymer resin, a filler, and a solvent to prepare a separator composition. Then, the separator composition is directly coated on an electrode and dried to form a separator film. Alternatively, the separator composition is cast on a support and dried to form a film which is then separated from the support and laminated on an electrode.

The polymer resin is not particularly limited and may be any material that can be used as a binder for an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof. In one embodiment, a vinylidenefluoride/hexafluoropropylene copolymer having from about 8 to about 25 wt % hexafluoropropylene may be used.

As shown in FIG. 6, the separator 4 is positioned between the cathode plate 2 and the anode plate 3 to form a battery structure. The battery structure is wound or folded and encased in a cylindrical battery case 5 or a square battery case (not shown). An organic electrolyte solution is then injected into the battery case 5 to complete a lithium ion battery 1.

Alternatively, the battery structure may be laminated to form a bi-cell structure and impregnated with an organic electrolyte solution. The resultant structure is encased in a pouch and sealed to complete a lithium ion polymer battery.

The organic electrolytic solution includes a lithium salt and a mixed organic electrolytic solution including a high dielectric constant solvent and a low boiling point solvent. If desired, the organic electrolytic solution may further include various additives such as an overcharge protection agent.

The high dielectric constant solvent used in the organic electrolytic solution is not particularly restricted and can be any such solvent commonly used in the art. Nonlimiting examples of suitable high dielectric constant solvents include γ-butyrolactone, cyclic carbonates such as ethylene carbonate, propylene carbonate and butylene carbonate, and the like.

The low boiling point solvent used in the organic electrolyte solution is also not particularly restricted and may be any such solvent commonly used in the art. Nonlimiting examples include dimethoxyethane, diethoxyethane, fatty acid ester derivatives, chain carbonates such as dimethyl carbonate, ethylmethyl carbonate, diethyl carbonate and dipropyl carbonate, and the like.

The volume ratio of the high dielectric constant solvent to the low boiling point solvent may range from about 1:1 to about 1:9. When the volume ratio is outside this range, the discharge capacity and charge/discharge cycle life of the battery may decrease.

The lithium salt used in the organic electrolytic solution may be any lithium salt that is commonly used in lithium batteries. Nonlimiting examples of suitable lithium salts include $LiClO_4$, $LiCF_3SO_3$, $LiPF_6$, $LiN(CF_3SO_2)_2$, $LiBF_4$, $LiC(CF_3SO_2)_3$ and $LiN(C_2F_5SO_2)_2$ and mixtures thereof.

The concentration of the lithium salt in the organic electrolytic solution may range from about 0.5 to about 2 M. When the concentration of the lithium salt is less than about 0.5 M, the conductivity of the electrolytic solution is low, resulting in degraded performance of the electrolytic solution. When the concentration of the lithium salt is greater than about 2.0 M, the viscosity of the electrolytic solution is high, thereby reducing lithium ion mobility.

The present invention will now be described with reference to the following Examples. However, the following examples are for illustrative purposes only and are not intended to limit the scope of the invention.

EXAMPLE 1

Silicon particles having primary particles with an average diameter of 20 μm and graphite particles having an average particle diameter of 6 μm were mixed in a weight ratio of 1:1. The mixture was milled for 60 minutes by high energy ball milling using a 8000M Mill (SPEX, New Jersey). A powdered nickel stearate was added to the obtained graphite-silicon complex material particles in a molar ratio of 0.2:1 and the result was mixed regularly. The mixture was sintered under an argon atmosphere at 900° C. for 3 hours to prepare an anode active material including a carbon layer, which formed 6 wt % of the anode active material.

Figure 3A:
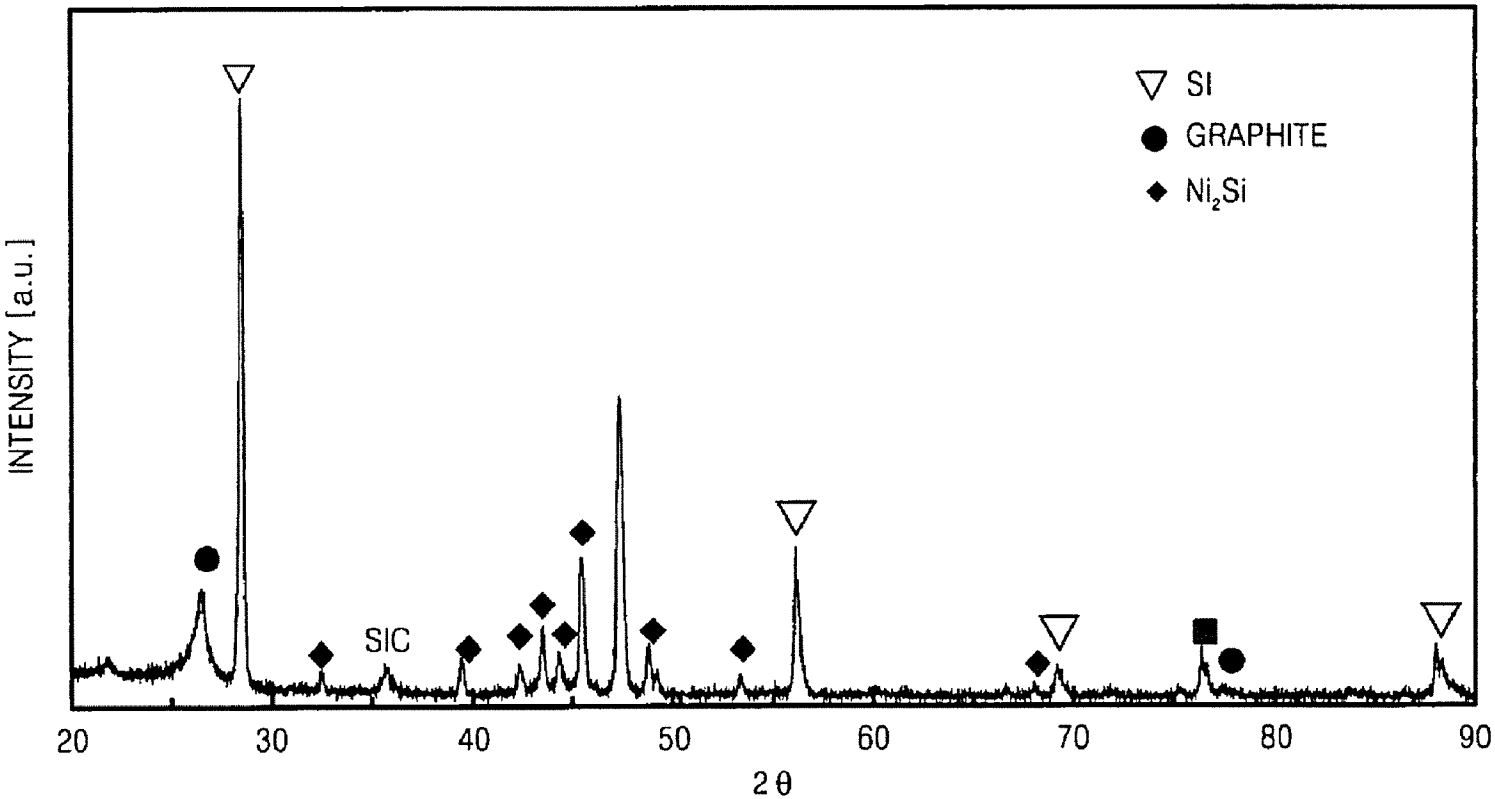
FIG. 3A is an X-ray diffraction analysis spectrum of the anode active material prepared according to Example 1.

FIG. 3A is an X-ray diffraction analysis spectrum of the anode active material prepared according to Example 1 above. The spectrum shows that silicon, a silicon-nickel alloy and graphite were formed as desired, and that silicon-carbon impurities were also formed.

Figure 4:
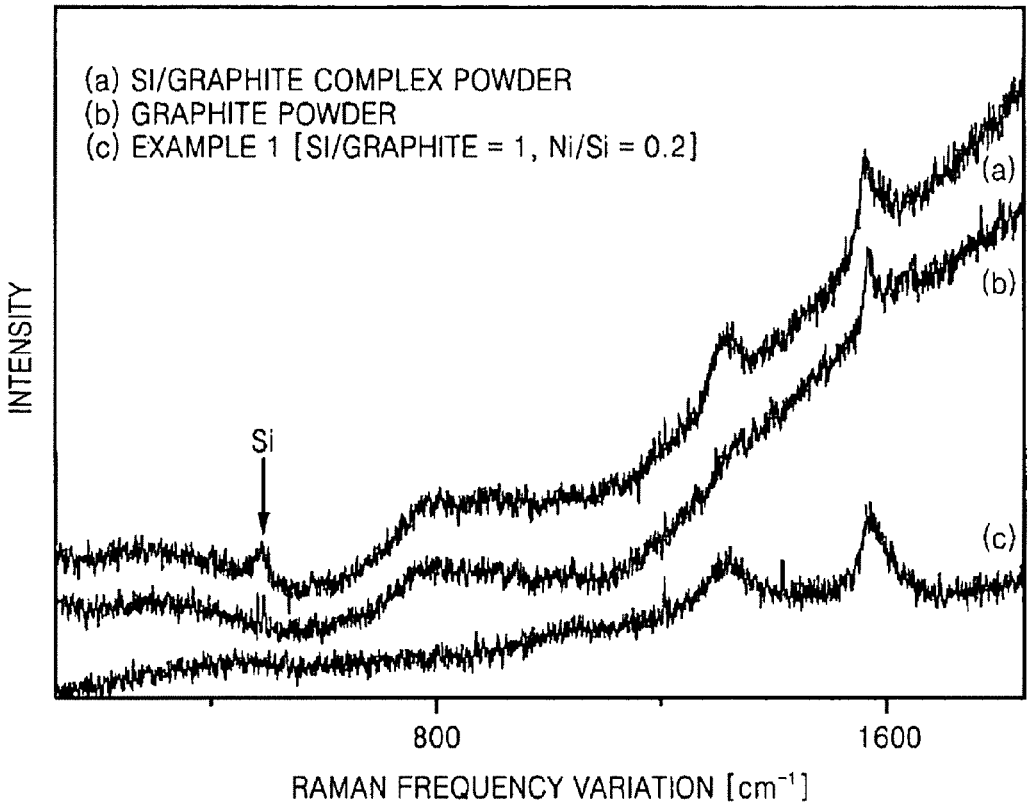
FIG. 4 is a Raman spectrum of the anode active material prepared according to Example 1.

FIG. 4 is a Raman spectrum of the anode active material prepared according to Example 1 above. Referring to FIG. 4, a Raman peak corresponding to silicon existing on the surface of the silicon-graphite complex material powder disappeared after the formation of the silicon-nickel alloy. This indicates that silicon on the surface was covered by the nickel-metal alloy and amorphous carbon. The amorphous carbon on the surface can be identified by the Raman spectrum. The high energy milling of the graphite increases the randomness of the graphite particles. Thus a D band, which is found in the range of 1,300 to 1,400 $cm^{-1}$ in the Raman spectrum, is larger than a G band, which is found in the range of 1,500 to 1,650 $cm^{-1}$ in the Raman spectrum. According to FIG. 4, the ratio of the D band to the G band of the silicon-graphite complex was 0.9, and the ratio of the D band to the G band of the silicon-graphite complex treated with nickel stearate was only 0.75. The ratio likely decreased since the damaged surface of the graphite particles was covered by the amorphous carbon layer through the nickel stearate treatment 1 g of the anode active material powder prepared according to Example 1, 0.3 g of polyvinylidene fluoride (PVDF) as a binder, and 0.3 g of super P carbon black were mixed with an N-methyl pyrrolidone (NMP) solution, and the mixture was coated on a copper foil to prepare an anode plate. Li was used as a cathode to prepare a 2016-type coin cell. The coin cell was charged/discharged 50 times at a voltage of between 1.2 and 0 V at a current density of 0.3 $mA/cm^2$. Ethylene carbonate (EC) in which 1.03 M $LiPF_6$ was dissolved, diethyl carbonate (DEC) and ethyl-methyl carbonate (EMC) were mixed in a volume ratio of 3:3:4 to form the electrolytic solution. The results of the charge/discharge processes are shown in Table 1.

EXAMPLE 2

An anode active material was prepared as in Example 1, except that the molar ratio of nickel to silicon was 0.2:1, the weight ratio of silicon to graphite was 1.33:1, and the carbon layer was 6.8 wt % of the anode active material.

A coin cell was manufactured and electrochemical evaluation was performed as in Example 1, except that the anode active material prepared according to Example 2 was used. The results are shown in Table 1.

EXAMPLE 3

An anode active material was prepared as in Example 1, except that the molar ratio of nickel to silicon was 0.2:1, the weight ratio of silicon to graphite was 1.2:1, and the carbon layer was 6.5 wt % of the anode active material.

A coin cell was manufactured and electrochemical evaluation was performed as in Example 1, except that the anode active material prepared according to Example 3 was used. The results are shown in Table 1.

EXAMPLE 4

An anode active material was prepared as in Example 1, except that the molar ratio of nickel to silicon was 0.2:1, the weight ratio of silicon to graphite was 0.5:1, and the carbon layer was 4 wt % of the anode active material.

Figure 3B:
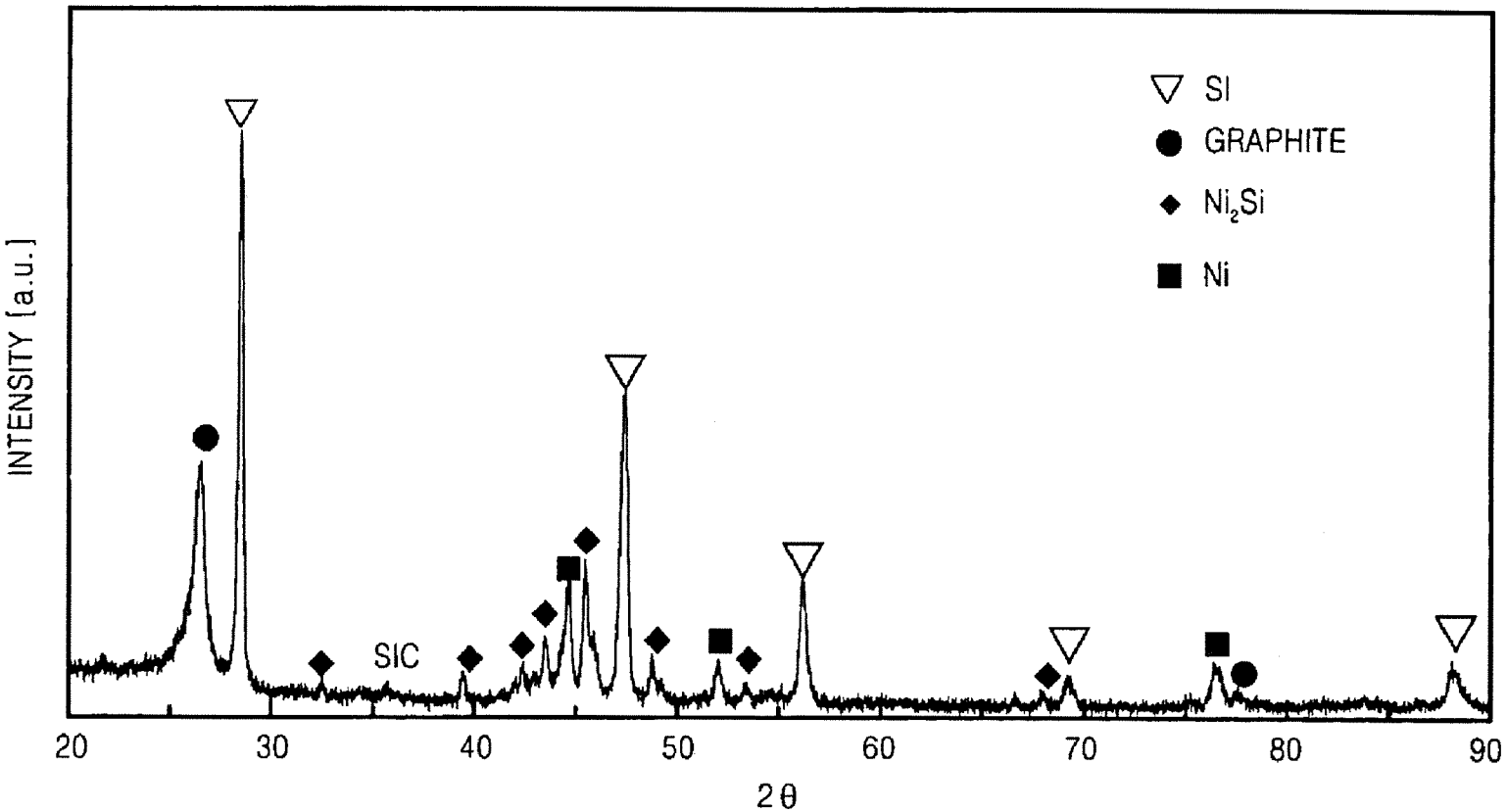
FIG. 3B is an X-ray diffraction analysis spectrum of the anode active material prepared according to Example 4.

FIG. 3B is an X-ray diffraction analysis spectrum of the anode active material prepared according to Example 4. The spectrum shows that silicon, a silicon-nickel alloy and graphite were formed as desired and silicon-carbon impurities and metal nickel impurities were also formed.

A coin cell was manufactured and electrochemical evaluation was performed as in Example 1, except that the anode active material according to Example 4 was used. The results are shown in Table 1.

EXAMPLE 5

An anode active material was prepared as in Example 1, except that the molar ratio of nickel to silicon was 0.1:1, the weight ratio of silicon to graphite was 1:1, and the carbon layer was 3 wt % of the anode active material.

A coin cell was manufactured and electrochemical evaluation was performed as in Example 1, except that the anode active material prepared according to Example 5 was used. The results are shown in Table 1.

EXAMPLE 6

7.5 g of stearic acid and 1.2 g of sodium hydroxide were added to 300 ml of water and sufficiently stirred until they were completely dissolved. 5.2 g of silver nitrate was added thereto, and the result was stirred for 3 hours. White powder on the surface of the result was collected and washed three times each with distilled water and with methanol to obtain silver stearate. An anode active material was prepared as in Example 1, except that silver stearate was used instead of nickel stearate, the molar ratio of silver to silicon was 0.2:1, the weight ratio of silicon to graphite was 0.5:1, and the carbon layer was 5.2 wt % of the anode active material.

A coin cell was manufactured and electrochemical evaluation was performed as in Example 1, except that the anode active material prepared according to Example 6 was used. The results are shown in Table 1.

EXAMPLE 7

14.2 g of stearic acid was added to 200 ml of an ethanol solution and sufficiently stirred at 60° C. until the stearic acid was completely dissolved. 5.0 g of copper acetate-monohydrate was dissolved in 200 ml of ethanol solution. Then, the two solutions were mixed and stirred for 3 hours. White powder on the surface of the result was collected and washed three times each with distilled water and with methanol to obtain copper stearate. An anode active material was prepared as in Example 1, except that copper stearate was used, the molar ratio of copper to silicon was 0.2:1, the weight ratio of silicon to graphite was 0.5:1, and the carbon layer was 6.3 wt % of the anode active material.

A coin cell was manufactured and electrochemical evaluation was performed as in Example 1, except that the anode active material according to Example 7 was used. The results are shown in Table 1.

COMPARATIVE EXAMPLE 1

Silicon particles having primary particles with an average diameter of 20 μm and graphite particles having an average particle diameter of 6 μm were mixed in a weight ratio of 1:1. The mixture was pulverized in a mortar to prepare a simply mixed silicon-graphite powder as an anode material.

A coin cell was manufactured and electrochemical evaluation was performed as in Example 1, except that the anode active material according to Comparative Example 1 was used. The results are shown in Table 1.

COMPARATIVE EXAMPLE 2

Silicon particles having primary particles with an average diameter of 20 μm and graphite particles having an average particle diameter of 6 μm were mixed in a weight ratio of 1:1. The mixture was milled by high energy ball milling using a 8000M Mill (SPEX, New Jersey) for 60 minutes to prepare a silicon-graphite complex powder as an anode material.

A coin cell was manufactured and electrochemical evaluation was performed as in Example 1, except that the anode active material according Comparative Example 2 was used. The results are shown in Table 1.

COMPARATIVE EXAMPLE 3

0.1 g of polyvinylalcohol (PVA) with a molecular weight of 500 was added to 10 ml of distilled water and stirred until the PVA was completely dissolved. Then, 1 g of a silicon-graphite complex powder prepared as in Comparative Example 2 was added, and the mixture was gradually heated while stirring until the water was completely evaporated to thereby obtain a solid containing a mixture of PVA and the silicon-graphite complex.

The solid was heated under an argon atmosphere to 900° C. for 3 hours to completely carbonize the PVA. Then, the carbonized product was pulverized in a mortar to prepare a silicon-graphite complex powder including carbon as an anode material.

A coin cell was manufactured and electrochemical evaluation was performed as in Example 1, except that the anode active material prepared according to Comparative Example 3 was used. The results are shown in Table 1.

COMPARATIVE EXAMPLE 4

Silicon particles having primary particles with an average diameter of 20 μm and graphite particles having an average particle diameter of 6 μm were mixed in a weight ratio of 1:2. The mixture was milled by high energy ball milling using a 8000M mill (SPEX, New Jersey) for 60 minutes to prepare a silicon/graphite complex powder as an anode material.

A coin cell was manufactured and electrochemical evaluation was performed as in Example 1, except that the anode active material prepared according to Comparative Example 4 was used. The results are shown in Table 1.

COMPARATIVE EXAMPLE 5

0.1 g of PVA with a molecular weight of 500 was added to 10 ml of distilled water and stirred until the PVA was completely dissolved. Then, 1 g of a silicon-graphite complex powder prepared as in Comparative Example 4 was added, and the mixture was gradually heated while stirring until the water was completely evaporated to thereby obtain a solid containing a mixture of PVA and the silicon-graphite complex.

The solid was heated under an argon atmosphere to 900° C. for 3 hours to completely carbonize the PVA. Then, the carbonized product was pulverized in a mortar to prepare a silicon-graphite complex powder including carbon as an anode material.

A coin cell was manufactured and electrochemical evaluation was performed as in Example 1, except that the anode active material prepared according to Comparative Example 5 was used. The results are shown in Table 1.

TABLE 1

| | Composition (Ni:Si = molar ratio, Si:graphite weight ratio) | Initial discharge capacity (mAh/g) | Capacity retention rate after 50 cycles (%) |
|---|---|---|---|
| Example 1 | Ni:Si = 0.2:1<br>Si:graphite = 1:1<br>amount of carbon = 6 wt % | 1150 | 45 |
| Example 2 | Ni:Si = 0.2:1<br>Si:graphite = 1.33:1<br>amount of carbon = 6.8 wt % | 820 | 62 |
| Example 3 | Ni:Si = 0.2:1<br>Si:graphite = 1.2:1<br>amount of carbon = 6.5 wt % | 840 | 74 |
| Example 4 | Ni:Si = 0.2:1<br>Si:graphite = 0.5:1<br>amount of carbon = 4 wt % | 850 | 70 |
| Example 5 | Ni:Si = 0.1:1<br>Si:graphite = 1:1<br>amount of carbon = 3 wt % | 707 | 77 |
| Example 6 | Ag:Si = 0.2:1<br>Si:graphite = 0.5:1<br>amount of carbon = 5.2 wt % | 806 | 70 |
| Example 7 | Cu:Si = 0.2:1<br>Si:graphite = 0.5:1<br>amount of carbon = 6.3 wt % | 814 | 69 |
| Comparative Example 1 | Si:graphite = 1:1<br>simply mixed powder | 1234 | 5 |
| Comparative Example 2 | Si:graphite = 1:1<br>complex powder | 1470 | 11 |
| Comparative Example 3 | Si:graphite:carbon = 1:1:0.1<br>amount of carbon = 10 wt % | 1190 | 21 |
| Comparative Example 4 | Si:graphite = 0.5:1 | 1001 | 26 |
| Comparative Example 5 | Si:graphite:carbon = 0.5:1:0.1 | 900 | 10 |

As shown in Table 1, the anode active materials of Examples 1 to 7 exhibited lower initial discharge capacities than those of Comparative Examples 1 to 5. However, the capacities of the anode active materials of Examples 1 to 7 are more than twice those of graphite-based anode active materials (which have capacities of 350 mAh/g) and showed greater capacity retention after 50 cycles than those of the Comparative Examples. Excellent capacity retention properties are obtained by including the carbon layer and the nickel-silicon alloy, which prevent decreases in electrical conductivity inside the electrode, which decreases are normally caused by surface volume expansion during charging and discharging. The nickel-silicon alloy (which is not involved in the charge/discharge reactions) prevents the volume expansion and decreases volume changes inside the electrode.

Figure 5:
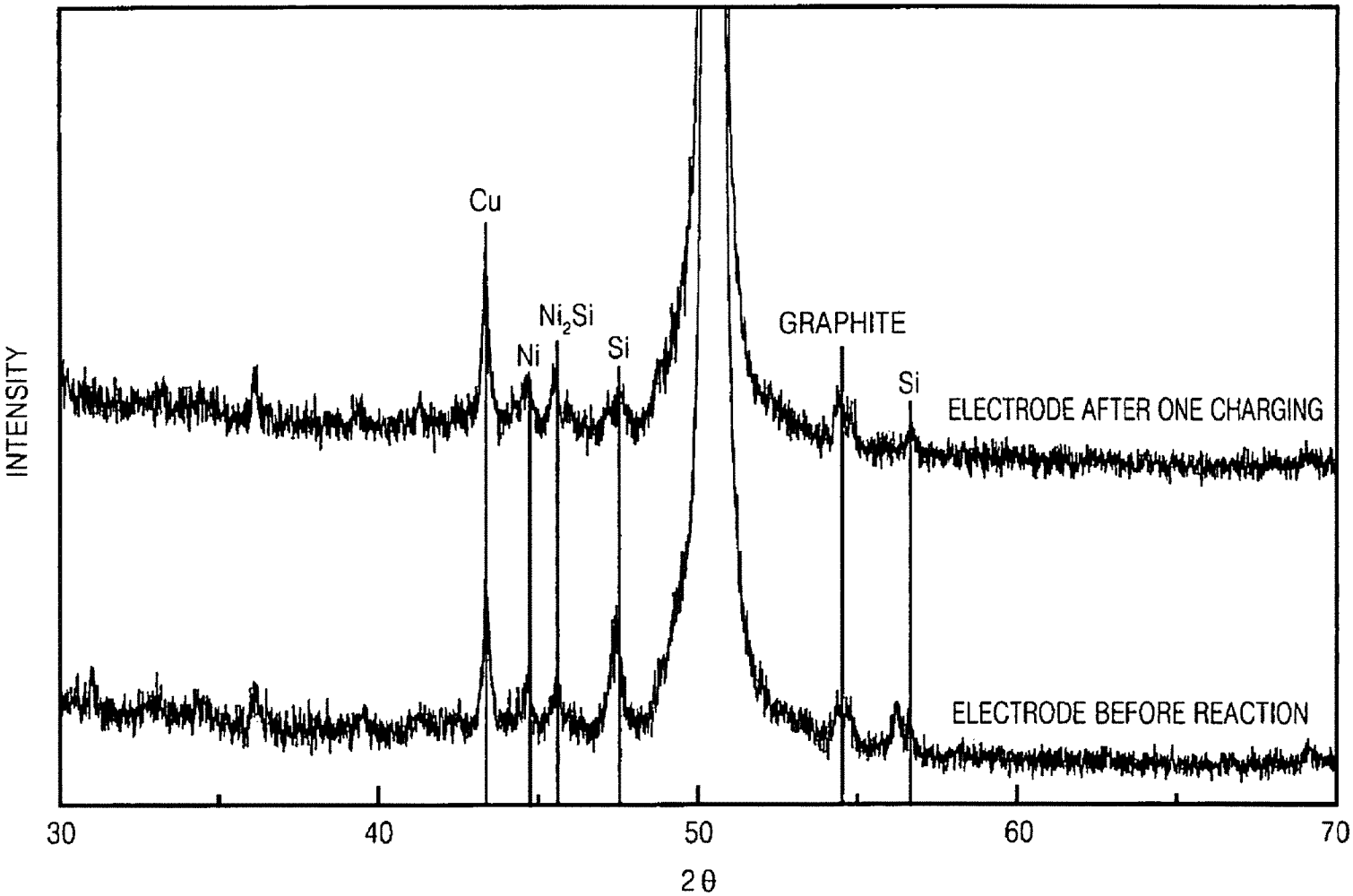
FIG. 5 is an X-ray diffraction analysis spectrum of the anode electrode prepared according to Example 5 before reaction and after charge/discharge.

FIG. 5 is an X-ray diffraction analysis spectrum of the anode electrode prepared according to Example 5, taken before reactions and after one charge/discharge cycle. The nickel-silicon alloy and nickel (which were not involved in the charge/discharge reactions) maintained their crystallinity. However, the crystallinity of the silicon sharply decreased after one charge/discharge cycle due to volume expansion and the damage caused by the volume expansion. Since the nickel and nickel-silicon alloy maintain their crystallinity, volume expansion and electrical conductivity decreases can be prevented using the nickel and nickel-silicon alloy. Therefore, factors causing resistance inside the electrode can be prevented, thereby improving the capacity retention properties of the electrode.

The anode active materials according to the present invention have high capacity and excellent capacity retention properties. The cycle properties of batteries using these anode active materials are also enhanced. Also, the anode active materials according to the present invention can be prepared by simple processes.

While the present invention has been illustrated and described with reference to certain exemplary embodiments, it will be understood by those of ordinary skill in the art that various modifications and alterations may be made without departing from the spirit and scope of the present invention as defined by the following claims.

What is claimed is:

1. An anode active material comprising:

a first material comprising a plurality of complex material particles comprising silicon and graphite;

a second material comprising a carbon layer covering at least a portion of a surface of the first material; and a third material comprising a silicon-metal alloy, the third material being formed between the first material and the second material.

2. The anode active material of claim 1, wherein the weight ratio of silicon to graphite in the first material is about 2.0 or less.

3. The anode active material of claim 1, wherein the weight ratio of silicon to graphite in the first material is about 1.5 or less.

4. The anode active material of claim 1, wherein the weight ratio of silicon to graphite in the first material ranges from about 0.5 to about 1.4.

5. The anode active material of claim 1, wherein the molar ratio of metal to silicon in the silicon-metal alloy is about 0.01 or greater.

6. The anode active material of claim 1, wherein the molar ratio of metal to silicon in the silicon-metal alloy ranges from about 0.1 to about 0.5.

7. The anode active material of claim 1, wherein the carbon layer is an amorphous carbon layer.

8. The anode active material of claim 1, wherein *the* carbon layer is present in an amount ranging from about 1 to about 20 wt % based on the total weight of the anode active material.

9. The anode active material of claim 1, wherein *the* carbon layer is present in an amount ranging from about 3 to about 15 wt % based on the total weight of the anode active material.

10. The anode active material of claim 1, wherein the metal of the silicon-metal alloy is selected from the group consisting of nickel, cobalt, copper, zinc, aluminum and magnesium.

11. The anode active material of claim 1, wherein the silicon-metal alloy is a silicon-nickel alloy.

12. The anode active material of claim 1, wherein the carbon layer covers the entire surface of the first material.

13. A lithium battery comprising:

a cathode;

an anode comprising the anode active material according to claim 1; and a separator.

14. A method of preparing an anode active material, the method comprising:

providing a mixture of silicon particles and graphite particles and milling the mixture *to form a milled mixture*;

adding to the *milled* mixture a salt selected from the group consisting of long-chain metal carboxylate salts and long-chain metal sulfonate salts *to form a second mixture*; and heat-treating the *second* mixture in an environment selected from the group consisting of a vacuum and an inert gas atmosphere.

15. The method of claim 14, wherein the salt comprises 20 or more carbon atoms and the metal is selected from the group consisting of nickel, cobalt, copper, zinc, aluminum and magnesium.

16. The method of claim 14, wherein the salt is selected from the group consisting of nickel stearate, nickel oleate, nickel palmitate, nickel linoleate, nickel laurate, nickel myristate, copper stearate, copper oleate, copper palmitate, copper linoleate, copper laurate and copper myristate.

17. The method of claim 14, wherein milling the mixture comprises high energy ball milling.

18. The method of claim 14, wherein the heat-treatment is performed at a temperature ranging from about 500 to about 1200° C. for a period of time ranging from about 0.5 to about 5 hours.

19. The method of claim 14, wherein an average particle diameter of the silicon particles ranges from about 0.05 to about 1 μm.

20. The method of claim 14, wherein an average particle diameter of the graphite particles ranges from about 1 to about 20 μm.

*21. The lithium battery of claim 13, wherein the weight ratio of silicon to graphite in the first material is about 2.0 or less.*

*22. The lithium battery of claim 13, wherein the weight ratio of silicon to graphite in the first material is about 1.5 or less.*

*23. The lithium battery of claim 13, wherein the weight ratio of silicon to graphite in the first material ranges from about 0.5 to about 1.4.*

*24. The lithium battery of claim 13, wherein the molar ratio of metal to silicon in the silicon-metal alloy is about 0.01 or greater.*

*25. The lithium battery of claim 13, wherein the molar ratio of metal to silicon in the silicon-metal alloy ranges from about 0.1 to about 0.5.*

*26. The lithium battery of claim 13, wherein the carbon layer is an amorphous carbon layer.*

*27. The lithium battery of claim 13, wherein the carbon layer is present in an amount ranging from about 1 to about 20 wt % based on the total weight of the anode active material.*

*28. The lithium battery of claim 13, wherein the carbon layer is present in an amount ranging from about 3 to about 15 wt % based on the total weight of the anode active material.*

*29. The lithium battery of claim 13, wherein the metal of the silicon-metal alloy is selected from the group consisting of nickel, cobalt, copper, zinc, aluminum and magnesium.*

*30. The lithium battery of claim 13, wherein the silicon-metal alloy is a silicon-nickel alloy.*

*31. The lithium battery of claim 13, wherein the carbon layer covers the entire surface of the first material.*

*32. The lithium battery of claim 13, wherein the metal of the silicon-metal alloy is selected from the group consisting of Transition metals, Group II metals, and Group XIII metals.*

*33. The anode active material of claim 1, wherein the metal of the silicon-metal alloy is selected from the group consisting of Transition metals, Group II metals, and Group XIII metals.*

*34. An anode active material comprising:*

*a first material comprising a plurality of complex material particles comprising silicon and graphite;*

*a second material comprising a carbon layer on at least a portion of a surface of the first material; and*

*a third material on at least a portion of the first material, the third material comprising a silicon-metal alloy.*

* * * * *